US006564383B1

(12) United States Patent
Combs et al.

(10) Patent No.: US 6,564,383 B1
(45) Date of Patent: May 13, 2003

(54) METHOD AND SYSTEM FOR INTERACTIVELY CAPTURING ORGANIZING AND PRESENTING INFORMATION GENERATED FROM TELEVISION PROGRAMS TO VIEWERS

(75) Inventors: James Lee Combs, Lexington, KY (US); William Walter Vetter, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/843,202

(22) Filed: Apr. 14, 1997

(51) Int. Cl.[7] ............................................... H09N 7/16
(52) U.S. Cl. ..................................... 725/136; 348/46.5
(58) Field of Search ........................... 725/20, 32, 53, 725/136; 348/465; H04N 7/16, 7/10, 7/25, 7/00, 11/00, 9/00

(56) References Cited

U.S. PATENT DOCUMENTS

| | | | |
|---|---|---|---|
| 4,857,999 A | | 8/1989 | Welsh |
| 5,481,296 A | * | 1/1996 | Cragun et al. .............. 725/136 |
| 5,530,852 A | | 6/1996 | Meske, Jr. et al. |
| 5,561,457 A | | 10/1996 | Cragun et al. |
| 5,703,655 A | * | 12/1997 | Corey et al. ................. 348/468 |
| 5,751,286 A | * | 5/1998 | Barber et al. ................ 345/835 |
| 5,862,223 A | * | 1/1999 | Walker et al. ................. 705/50 |
| 5,878,222 A | * | 3/1999 | Harrison ...................... 725/139 |
| 5,950,200 A | * | 9/1999 | Sudai et al. ................... 707/9 |
| 6,263,507 B1 | * | 7/2001 | Ahmad et al. .............. 725/134 |

OTHER PUBLICATIONS

Content-based Video Indexing.
The TextGrabber VBI Video Decoding System.

* cited by examiner

Primary Examiner—Andrew Faile
Assistant Examiner—Andrew Y. Koenig
(74) Attorney, Agent, or Firm—James A. Lucas; Driggs, Lucas, Brubaker & Hogg Co., LPA (57) ABSTRACT

A method and system is provided for capturing, organizing, and presenting information generated from a television program. The method monitors closed caption data of television programs for transition symbols and user defined search parameters and scheduling information. Information relating to captured television programs is entered into a capture management database for assembly into an interactive results file. The interactive results file allows a user to browse, view and navigate the captured television program information.

16 Claims, 10 Drawing Sheets

| Entry | First Sentence of Video Segment | Date | Time | Ch. | Length | Snap-Shot File | Video/Audio File | Capture |
|---|---|---|---|---|---|---|---|---|
| 1 | IBM releases new computer. | 12/30/99 | 09:15 A.M. | 10 | .2 | 121031AE.JPG | 121031AE.MPG | 1 |
| 2 | IBM shares soar on the Market. | 12/30/99 | 10:17 A.M. | 3 | .3 | 121031DC.JPG | 121031DC.MPG | 1 |
| 3 | Computer Industry Highlights. | 12/31/99 | 01:36 P.M | 10 | U | 121031ER.JPG | 121031ER.MPG | U |

METHOD AND SYSTEM FOR INTERACTIVELY CAPTURING ORGANIZING AND PRESENTING INFORMATION GENERATED FROM TELEVISION PROGRAMS TO VIEWERS

FIELD OF THE INVENTION

The invention relates generally to multimedia computer systems, and, more particularly, to multimedia computer systems for interactively playing, recording and displaying video and audio information generated from television programming.

BACKGROUND OF THE INVENTION

Television has been heretofore and currently remains the most important and convenient means of presenting information to individuals and the public at large. With the advent of satellite and cable television, an individual may choose from an almost unlimited choice of television programs. These programs range from informative programs, such as news and infomercials, to sports and entertainment programs. With such an almost unlimited choice of programming, it is difficult to convey to viewers the content of such television programs.

Daily, weekly, and monthly programming guides can only provide a limited amount of information to viewers because of the large number of television programs which need to be described. Additionally, not all viewers subscribe or have access to such weekly or monthly programming guides. Furthermore, for up-to-the-minute news programs, it is almost impossible for a viewer to know the content of news breaking stories.

Moreover, many television programs present information in a series of short information segments. These television programs include evening news casts, news and sports headline programs, weather programs and info-tainment programs. Additionally, some of these programs are on dedicated television networks, such as the Cable News Network's Headline News (CNN Headline News) and often present the headlines on a cyclical basis (e.g., every-half hour). Therefore, if a viewer misses a news story of interest, the viewer must wait until the next cycle of the news (e.g., one-half hour) for the news story of interest to be updated. This wait is often times frustrating for viewers. A viewer must either watch other news stories, which may or may not be of interest, or remember to watch the same television channel one-half hour later. Additionally, there is no guarantee that the news story of interest will even appear in the next cycle of the news. Therefore, the viewer would have spent one-half hour waiting for a news story which did not appear in the next segment but may still appear in later news segments.

The Internet, or World Wide Web as it is sometimes called, also provides individuals with news and entertainment. For example, one may visit a news site on the Internet, such as the Cable News Network, and search for stories of interest in their news libraries. Once a news story is found, an individual may read and/or view video of the news breaking story. However, the video quality is often poor and the time to download the video to the user's computer can be quite long. Additionally, as is a common occurrence on the Internet, there may be heavy traffic (i.e., there are many users accessing the site) and therefore, it may difficult to gain access to the site or download the requested information. Likewise, users must also typically pay a monthly access fee to an Internet provider for Internet access.

Other approaches for providing viewers with television programming content also exist, such as online television guides and preview channels with television listings. However, these approaches also suffer from the above described drawbacks in that they provide limited information on the television program content, require online computer access, and/or cannot provide information on news-breaking stories. Accordingly, a method and system which is free from such drawbacks is desired.

SUMMARY OF THE INVENTION

According to the present invention, a method and system for capturing, organizing, and presenting information generated from a television program is provided. The method includes the steps of: providing a multimedia computer system; inputting a broadcast television signal into the multimedia computer system; generating digital video and closed caption data from the broadcast television signal; monitoring the closed caption data for transition indications; after the occurrence of a transition indication, storing the digital video to a storage device; after the occurrence of a transition indication, storing the closed caption data comprising a portion of text; after a predetermined time period following the occurrence of a transition indication, generating a snap-shot image of the video; and after the occurrence of a transition indication, monitoring the closed caption data for a specified condition. The method further includes the steps of: setting a flag after the occurrence of the specified condition to indicate that a segment of the television signal satisfies the specified condition; generating an email message indicating an occurrence of the specified condition; generating an interactive list comprising the snap-shot image and the stored closed caption text; and generating a file comprising the interactive list.

The step of storing the closed caption data including a portion of text, after the occurrence of a transition indication includes the step of storing all closed caption data between the transition indication and a predetermined ending condition. After the video, the snap-shot image of the video, and the closed caption data are all captured, they are associated with each other in a capture management database from which the interactive list and file is generated.

The system of the present invention includes a multimedia computer system having: a CPU; a storage device for storing digital data; a display device for display multimedia information; a video tuner for receiving one or more television signals and for generating digital video and audio and closed caption data; and logic for capturing, organizing, and generating information from a television signal.

The logic for capturing, organizing, and generating information from a television signal includes: logic for storing the digital video and audio to the storage device; logic for monitoring the closed caption data for a transition indication; logic for storing the closed caption data corresponding to a portion of the closed caption data occurring after the transition indication; logic for determining whether the closed caption data includes a specified condition; logic for generating an interactive list comprising the portion of the closed caption data wherein the portion of the closed caption data is linked to the digital video and audio data; and logic for playing the digital video and audio responsive to the selection of a linked portion of closed caption data.

It is therefore an advantage of the present invention to provide a method and system which allows television viewers to monitor and capture television programs that include topics or issues of interest without having to actually watch the television programs.

It is a further advantage of this invention to provide a method and system which allows television viewers to monitor and capture television programs with little or no pre-hand knowledge of the television programs' contents.

It is still a further advantage of this invention to provide a method and system which allows television viewers to immediately be notified when a television program includes a topic or issue of interest and to allow the television viewer to immediately view the television program.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to example the principles of this invention.

DETAILED DESCRIPTION OF ILLUSTRATED EMBODIMENT

Figure 1:
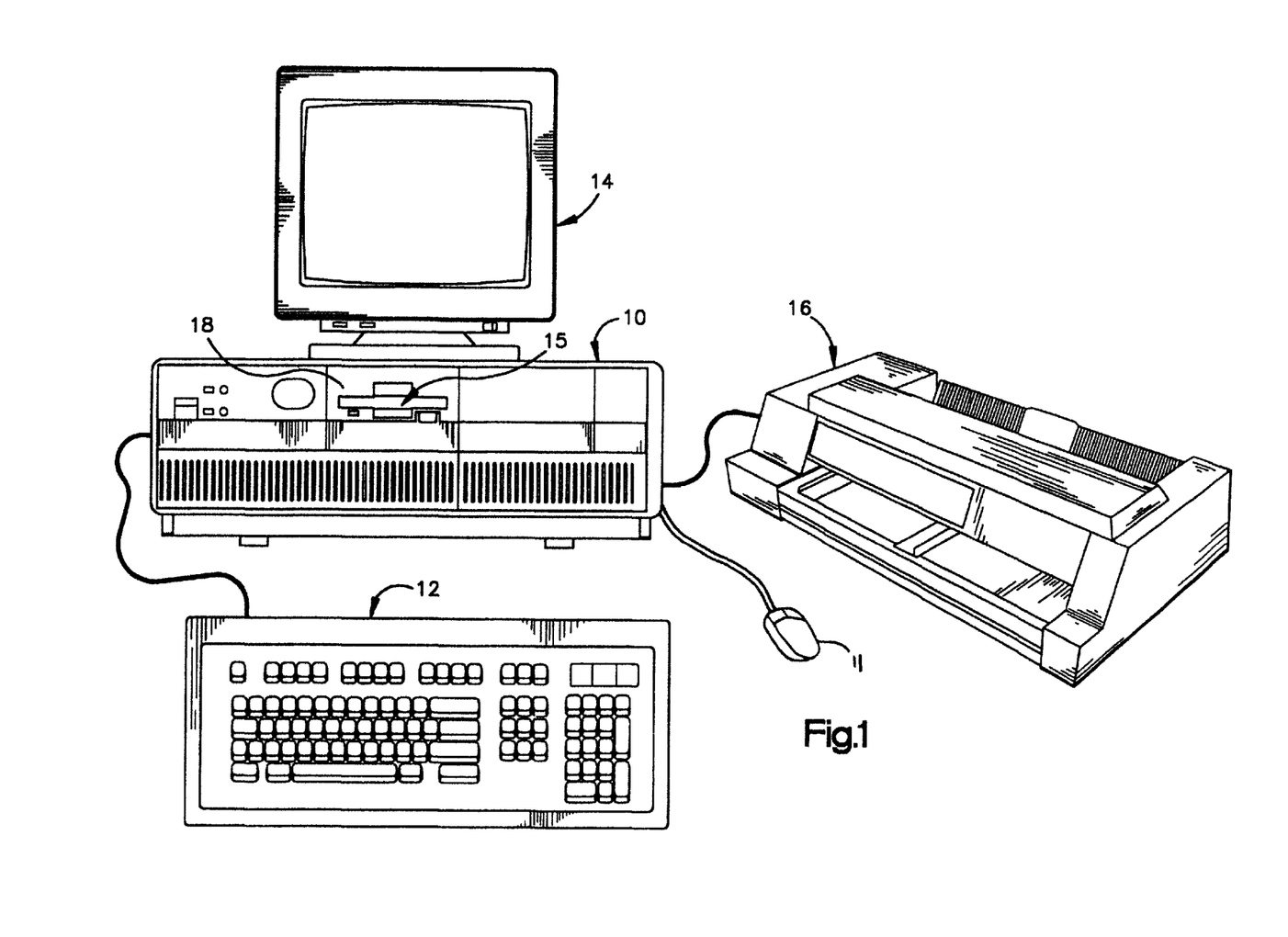
FIG. 1 is a diagram illustrating a multimedia personal computer of the present invention with certain other peripheral equipment.

Referring now to the drawings, and for the present to FIG. 1, a microcomputer embodying the COG logic of the present invention is shown and generally indicated at 10. The computer 10 may have an associated monitor 14, keyboard 12 and printer or plotter 16 and mouse 11.

Figure 2:
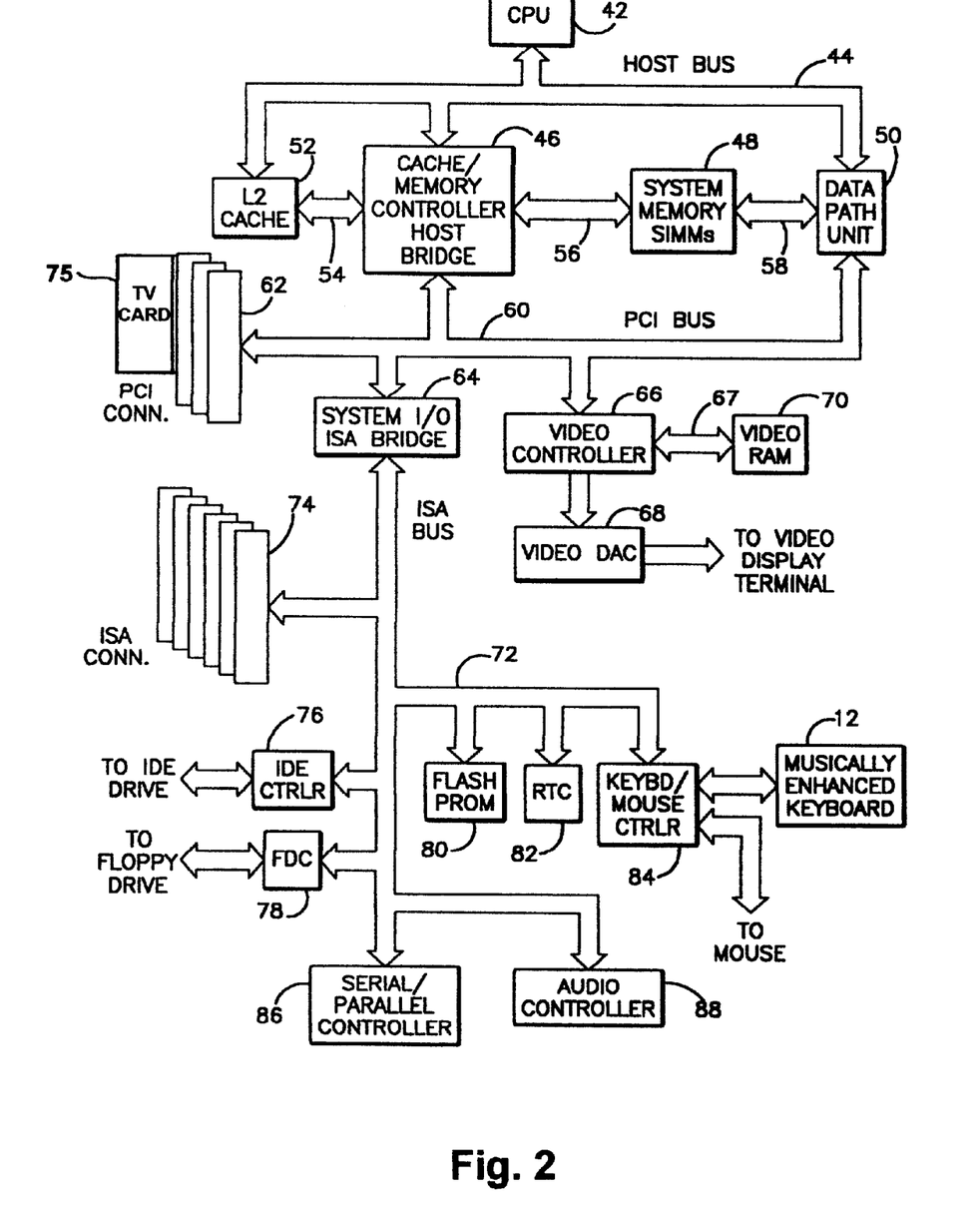
FIG. 2 is a block diagram of the multimedia computer system of present invention.

Prior to relating the above structure to the present invention, a summary of the general operation of the personal computer system 10 merits review. Referring to FIG. 2, there is shown a block diagram of a personal computer system illustrating the various components of the computer system 10. Connected to a planar board (not shown) is the system processor 42. While any appropriate microprocessor can be used as the CPU 42, one suitable microprocessor is the Pentium® which is sold by Intel Corp. The CPU 42 is connected by a high speed CPU host bus 44 to a cache/memory controller and host bridge 46, data path unit 50, and second level cache memory (L2 cache) 52.

The cache/memory controller and host bridge 46 is connected to L2 cache 52 via a bus 54 and to a system memory 48 via a bus 56. The cache/memory controller and host bridge 46 integrates the L2 cache 52 and system memory 48 control functions and provides address paths and bus controls for transfers between the Host (CPU 42), system memory 48, and a Peripheral Component Interconnect (PCI) bus 60. The PCI bus 60 employs a 32 bit data bus that supports multiple peripheral components and add-in cards at a peak bandwidth of 132 MB/second.

During bus operations between the Host (CPU 42), system memory 48, and PCI bus 60, the cache/memory controller 46 provides the address paths and bus controls. The cache/memory controller 46 also controls data flow through the data path unit 50.

The data path unit 50 provides data path connections between the Host (CPU 42), system memory 48, and PCI bus 60. The system memory 48 is interfaced to the data path unit 50 via a data bus 58 whereby data is transmitted into and out of the system memory 48. The cache/memory controller 46 and the data path unit 50 provide a full function data path connection to system memory 48 and from PCI bus 60 to a Host subsystem (CPU 42).

PCI bus 60 is further connected to a plurality of PCI bus expansion slots 62 (three slots are shown), system I/O bridge controller 64, and video controller 66. The system I/O bridge controller 64 provides a bridge between the PCI bus 60 and an ISA bus 72 (or an EISA bus; not shown) and integrates many of the common I/O functions found in ISA (or EISA) based PC systems. The video controller 66, which is associated with a video RAM 70 for storing graphic information via a bus 67, is interfaced to the PCI Bus 60 to allow large amounts of data required for high performance graphics to be transmitted quickly to the video controller 66. Video signals generated by video controller 66 may be passed through a Digital to Analog Converter (DAC) 68 to a video display terminal or other display device.

Various peripheral devices are typically connected to the ISA bus 73, such as ISA expansion slots 74 (6 are shown), IDE hard disk controller 76, floppy disk controller (FDC) 78, flash PROM (BIOS) 80, real time clock 82, keyboard/mouse controller 84, serial/parallel controller 86, and optionally, Audio controller 88. A television card 75 having a tuner, MPEG 1 and/or MPEG 2 video encoder and closed caption decoder is shown connected to a slot in PCI expansion slots 62.

While the above description has been described with some particularity, it is to be understood that the present invention may be used in conjunction with other hardware configurations. For example, other peripheral components such an Ethernet controller, multimedia controller, or Small Computer System Interface II (SCSI II) controller may be added to PCI bus 60.

Figure 3:
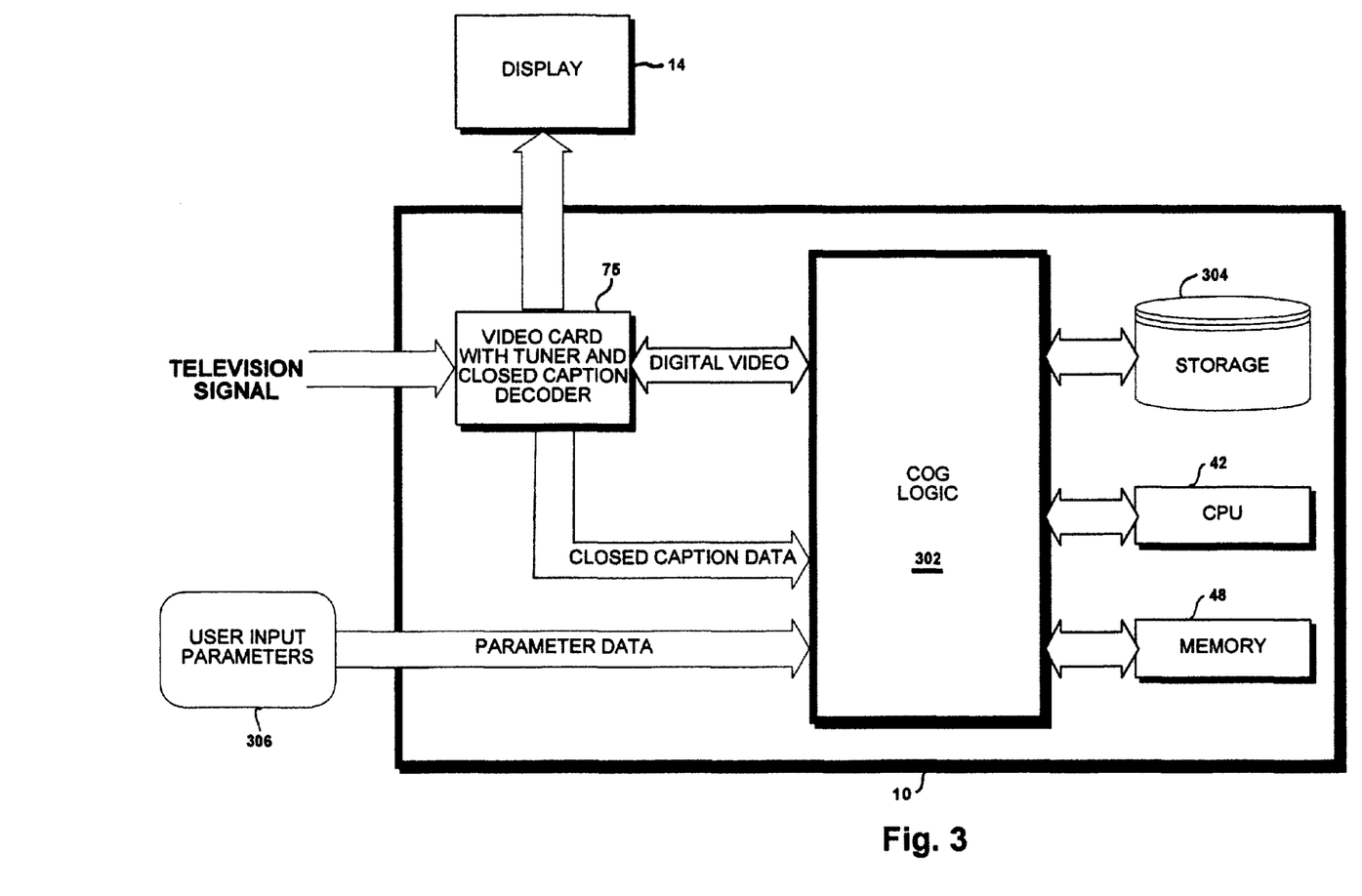
FIG. 3 is a high-level block diagram of certain components of the present invention.

Referring now to FIG. 3, a high-level block diagram of certain components of the present invention is shown. Specifically, a television signal is input into the television card 75. The television signal may be a broadcast television signal or a previously recorded television signal. The television card 75 decodes the television signal into digital video and audio and closed caption data. Included within computer system 10 is Capture, Organization, and Generation logic 302 (hereinafter COG logic 302). User parameters 306 are input via keyboard 12 and/or mouse device 11 (both shown in FIG. 1). The CPU 42 loads and executes the COG logic 302 along with accompanying system memory 48 and storage device 304. Storage device 304 is preferably a hard-disk storage device or other similar high capacity, quick access storage device. Based on the user input parameters 306, the COG logic 302 captures, organizes, and generates a capture file which allows a user to view, select, and play captured video and audio which satisfy the user's input parameters 306. The capture file is preferably an HyperText Markup Language (hereinafter HTML) file. However, any file type that allows a user to view, select, and play captured video may be employed.

Figure 4:
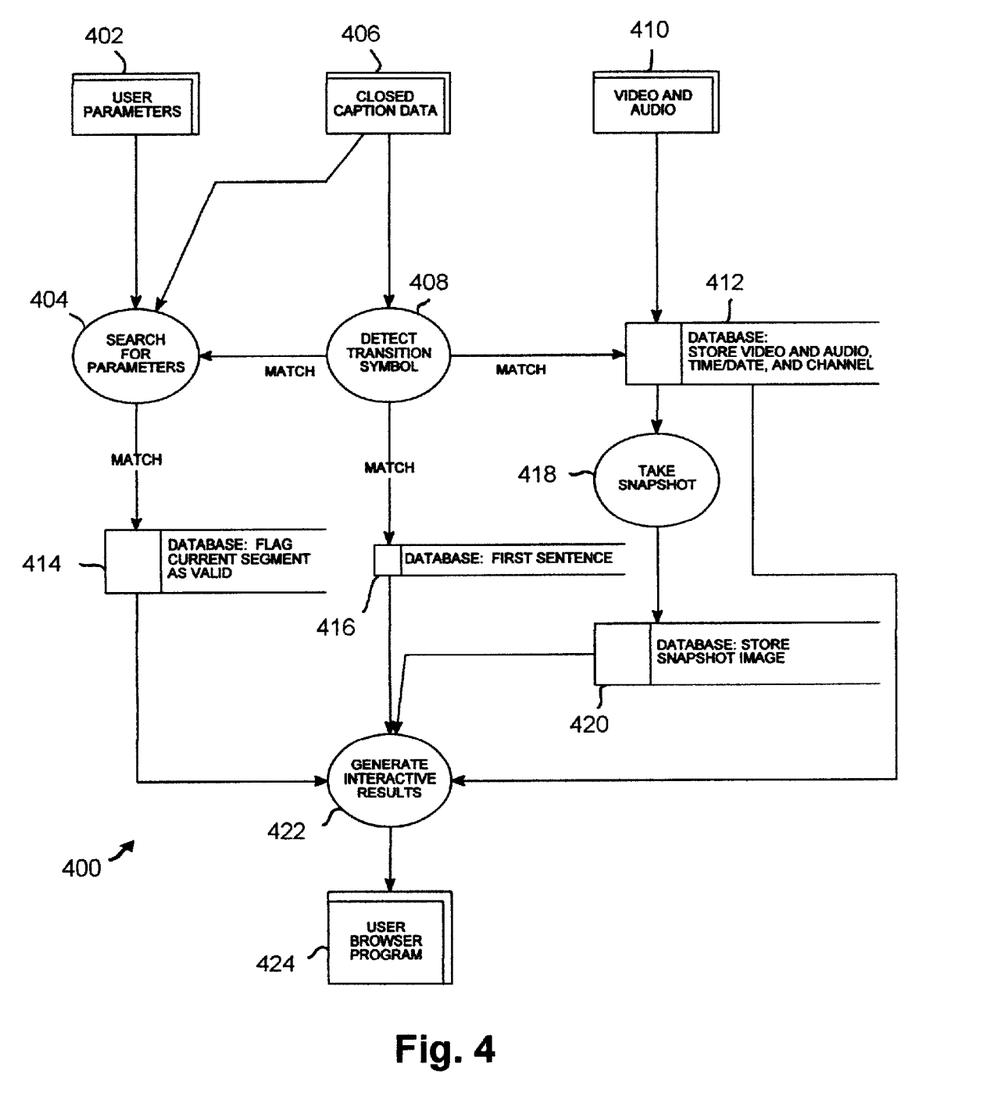
FIG. 4 is a data-flow diagram of the present invention.
Figure 8:
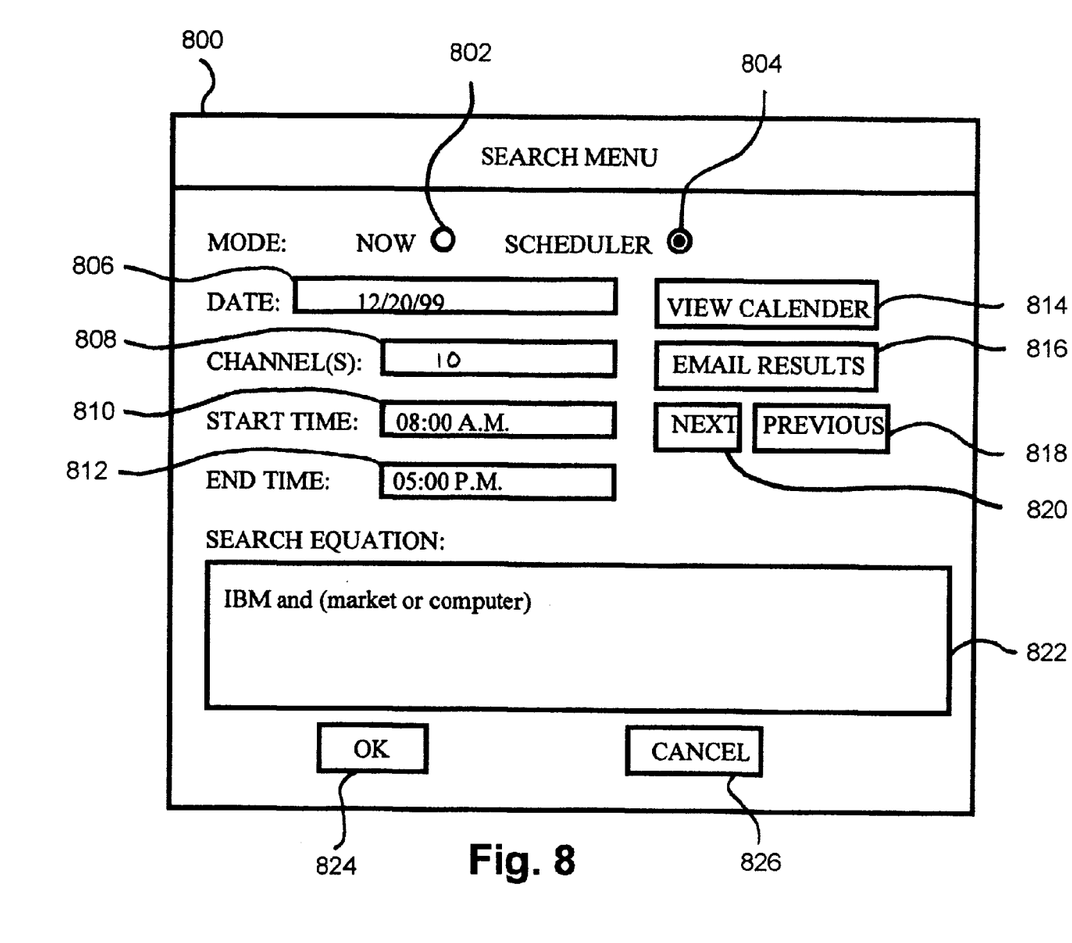
FIG. 8 is an illustration of a search parameters and scheduling information menu.

Before discussing the particulars of the COG logic 302 of the present invention, an overview of the COG logic 302 data flow will be presented. Referring now to FIG. 4, a data flow diagram 400 is shown. The data flow and organization of the present invention is maintained via the creation and management of a database which actively tracks and associates the data and information generated by the COG logic 302. The database structure is shown in FIG. 8 and described in detail in the text associated with that Figure.

Still referring to FIG. 4, closed caption data 406 is input into detect transition symbol analysis 408. Upon a detection of a transition symbol (i.e., a "MATCH"), a search for user parameter data 404 executes. Specifically, the closed caption data 406 is searched for user parameters 402 in the search for parameters analysis 404. The user parameters 402 may be the same as user input parameters 306 or may be a sub-set of these parameters. For example, the user parameters 402 may includes the words "IBM" and "shares." User parameters are discussed in more detail in the text associated with FIG. 9. Also upon a detection of a transition symbol, a database function 412 stores digital video and audio 410 to the storage device and creates an entry in the database with the name of the digital video and audio file, along with the time, date, and channel of the digital video and audio being stored. The digital video and audio is preferably stored to a storage device in a MPEG 1 or MPEG 2 compatible file. Additionally, after a predetermined time period has lapsed following the detection of a transition symbol, a snap-shot image of the video being stored is taken at 418. This predetermined time period is preferably 8 seconds after the detection of a transition symbol and is written to the storage device preferably as a JPEG file. MPEG 1, MPEG 2, and JPEG files are well-known and will not be discussed. However, other well-known video and image file types, such as AVI and GIF, may also be employed. Still further, any suitable video or image file.

If the search for parameters analysis 404 indicates that the closed caption data includes, or satisfies, the user parameters 402 (i.e., a "MATCH"), a database function 414 flags the current video segment being stored as valid in the database. However, if the detection of a transition symbol occurs prior to a match for the user parameters, the video currently being stored is erased and the database entries for the current video being stored are deleted. Such a condition indicates that the current video segment has ended without satisfying the user parameters 402. Once all of the user parameters 402 have been examined with relation to the closed caption data of the television signal and at least one entry in the database has been flagged as valid, a HTML file is generated at 422 which will allow a user to interactively view the results in a browser-type program. Browser-type programs include Microsoft's INTERNET EXPLORER and Netscape's NAVIGATOR. Interactively viewing the results includes viewing the captured video and audio.

Figure 5:
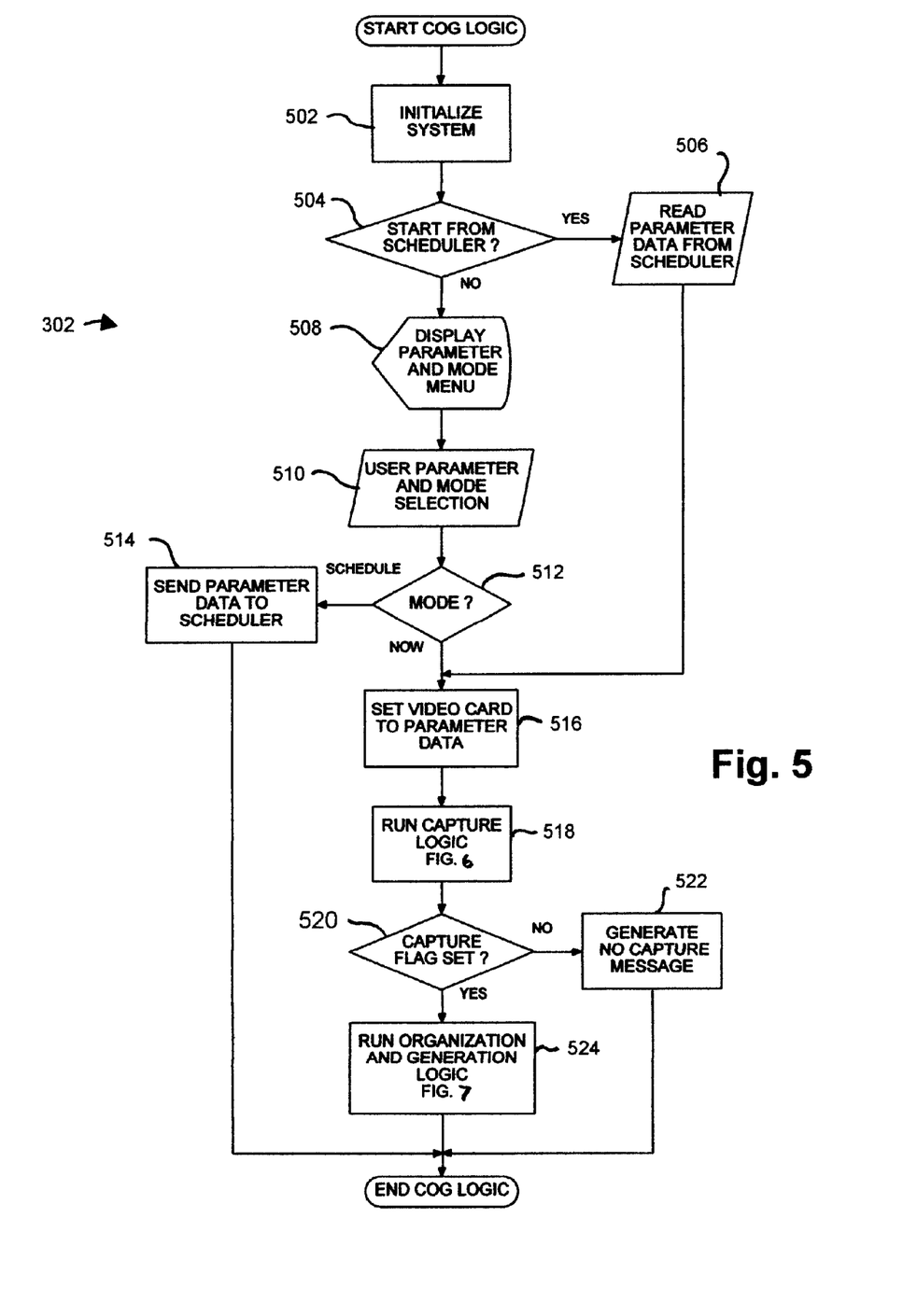
FIG. 5 a is flowchart illustrating the Capture, Organization and Generation logic (hereinafter COG logic) of the present invention.

Referring now to FIG. 5, a flowchart of the COG logic 302 is shown. The COG logic starts in step 502 where the computer system 10 and the COG logic variables are initialized to their starting values or states. After step 502, the logic proceeds to step 504. In step 504, the logic tests a scheduler flag to determine whether the COG logic has been initiated by an external schedule program. For example, the APTIVA® Scheduler program found on most IBM APTIVA® computers may be programmed with scheduling information, such as time, date, channel, and search equations, that would initiate the COG logic at the scheduled time. It should be noted that other scheduler or timer programs may be adapted to also initiate the COG logic. In this manner, the COG logic would not have to remain active, either in the foreground or background of the computer operating system. If the COG logic was initiated from a scheduler or timer program, the COG logic proceeds to step 506. In step 506, the COG logic reads the parameter data, which includes the scheduling information, from the scheduler or timer program. Also, as is conventional, this information may be read via a linked file. The parameter data is discussed in more detail in the text associated with FIGS. 8 and 9. If in step 504, however, the COG logic was not initiated by a scheduler or timer program, the COG logic advances to step 508.

In steps 508 and 510, the COG logic displays a search parameter and mode menu for entering search parameter data and scheduling information. Referring now to FIG. 8, the search parameter and mode menu 800 is shown. The menu 800 includes mode-select bullet items NOW 802 and SCHEDULER 804 for entering the scheduling mode. Scheduling mode NOW 802 indicates that the current search information is to be presently executed. Scheduling mode SCHEDULER 804 indicates that the current search information and schedule is to be executed at a future time via a scheduler or timer program. A schedule mode flag is set upon the selection of the SCHEDULER 804 bullet item. The menu 800 also includes fields for the entry of DATE 806, CHANNEL(S) 808, START TIME 810, END TIME 812 and SEARCH EQUATION 822 information. The DATE 806 field can accept date information of a plurality of forms (e.g., April 14, 1999; 12/20/98; 10.3.98, etc.) The CHANNEL 808 field can accept single or multiple channel Information. The START TIME 810 and END TIME 812 fields can accept time information via A.M. and P.M. or 24 hour notation. The SEARCH EQUATION 822 field can accept a plurality of search terms and supports Boolean search modifiers. The menu 800 also includes VIEW CALENDAR 814, EMAIL RESULTS 816, NEXT 820, and PREVIOUS 818 menu buttons. The VIEW CALENDAR 814 button calls a calendar program to be displayed on the computer system display for assisting in scheduling. The EMAIL RESULTS 816 button calls an email function which allows the entry of email addresses to be notified upon detection of successful search results. The email to be generated may include a link to the captured video and audio files so that a recipient of the email may immediately play the captured video and audio. The NEXT 820 and PREVIOUS 818 buttons allow a user to navigate the schedule information by viewing and/or modifying previously entered search parameters and scheduling mode information or entering new or additional search parameters and scheduling mode information.

After step 510, the COG logic proceeds to step 512 where the schedule mode flag is tested to determine whether the search parameters and scheduling information are to be currently executed or sent to a scheduler or timer program for later execution. If the schedule mode flag is set, the COG logic proceeds to step 514 where the search parameters and scheduling information are sent to the scheduler or timer program. After step 514, the COG logic ends. If in step 512, the schedule mode flag is not set, or after step 506, the COG logic proceeds to step 516.

In step 516, the COG logic sets the video or television card to the search parameters data in preparation of execution of the search parameters and scheduling information.

After step 516, the COG logic advances to step 518 where execution of the CAPTURE logic is performed. The CAPTURE logic is responsible for capturing the video, audio, image, and closed caption data which satisfies the search parameters. If a television segment satisfies the user search parameters, the CAPTURE logic sets one or more capture flags. The CAPTURE logic is discussed in more detail in the text associated with FIG. 6. After step 518, the COG logic proceeds to step 520 where one or more capture flags are tested to determine if at least one is set. If no capture flags have been set by the CAPTURE logic, then the COG logic advances to step 522 where a NO CAPTURE message is generated. The NO CAPTURE message may be generated as a pop-up message window and/or may be sent via email to one or more recipients to indicate that there were no captures for specified search parameters and scheduling information. After step 522, the COG logic ends. If in step 520, one or more capture flags have been set by the CAPTURE logic, then the COG logic proceeds to step 524 where the ORGANIZATION and GENERATION logic (hereinafter OG logic) is executed. The OG logic is responsible for organizing the captured video, audio, image, and close caption data into an interactive results file for execution by a browser-type program. The OG logic is discussed in more detail in the text associated with FIG. 7. After either step 522 or 524, the COG logic ends.

Figure 6:
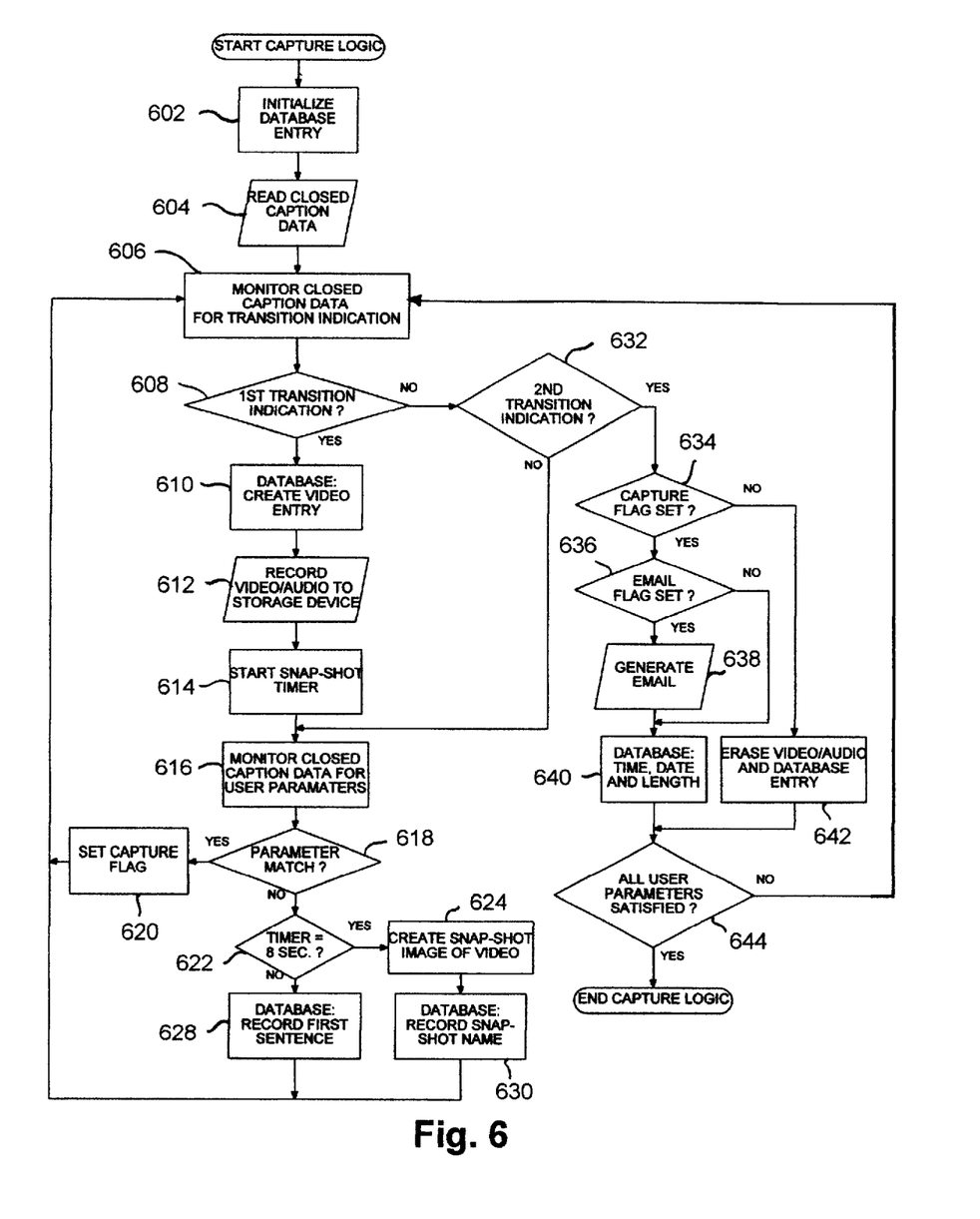
FIG. 6 is a flowchart illustrating the Capture logic of the present invention.
Figure 9:
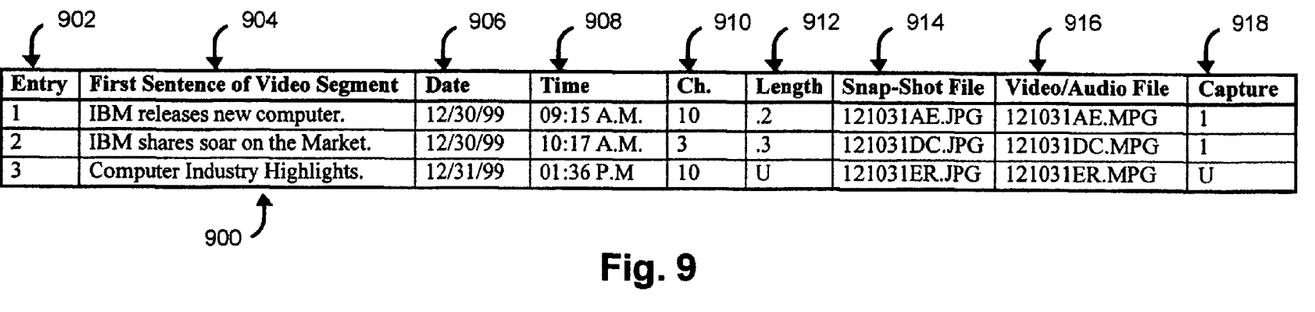
FIG. 9 is an illustration of a portion of a capture management database of the present invention.

Referring now to FIGS. 6 and 9, a discussion of the CAPTURE logic 600 and a capture management database 900 will now be presented. The CAPTURE logic begins in step 602 where the capture management database 900 is initialized and an entry is created. The capture management database 900 includes the following fields: Entry 902, First Sentence of Video Segment 904, Date 906, Time 908, channel Ch. 910, Length 912, Snap-Shot File name 914, Video/Audio File name 916, and Capture flag 918. The execution of the CAPTJRE logic 600 and the capture management database 900 will hereinafter be discussed with reference to the search parameters and scheduling information shown in FIG. 8.

After step 602, the CAPTURE logic advances to step 604 where it reads the closed caption data generated by the television card 75. The closed caption data is preferably in the form an ASCII character data stream from the television card 75 closed caption decoder. After step 604, the CAPTURE logic proceeds to step 606 where the closed caption data stream is monitored for a transition indication. A transition indication is any closed caption symbol or combinations of symbols that are used by the television channel, program, or network to indicate the end of a television segment and the start of a next television segment. For example, it as been observed that a transition symbol of ">>>" is used by CNN Headline News to indicate the end of a television segment and the start of a next television segment. It has also been observed that a transition symbol of "++" is employed by the Columbia Broadcasting Company (i.e., CBS) during their nightly news programs. Other channels, programs, or networks may employ different transition symbols, however, the CAPTURE logic may be programmed to recognize any known transition symbol.

If a first transition indication has been detected in the closed caption data, the CAPTURE logic proceeds from step 608 to step 610. The first transition indication detection is managed via detection flag that is set to indicate that a first transition indication has been seen by the Capture logic. In step 610, an entry is created in the Entry 902 field of the capture management database 900. After step 610, the CAPTURE logic advances to step 612 where the television signal video and audio are stored to the hard-disk storage device. In step 614, a snap-shot timer is started and is used for determining the appropriate time when a snap-shot image of the video should be taken. In steps 616, the closed caption data stream is monitored for the user search parameters.

If a user search parameters match is detected in step 618, the Capture logic advances to step 620 where a capture flag is set. After step 620, the Capture logic loops back to step 606. If in step 618, however, there is no user search parameters match, the Capture logic advances to step 622. In step 622, the snap-shot timer is tested to determine whether it is equal to 8 seconds. If so, the Capture logic proceeds to step 624 where a snap-shot image of the video is created and the name of the image is recorded in the database (step 630). If, however, the snap-shot time is not equal to 8 seconds, the Capture logic advances to step 628. In step 628, the Capture logic enters the first sentence following a transition indication into the database. The first sentence is subsequently used to identify the nature and content of the video segment. It should be noted that once step 628 is performed for the current video/audio segment, it is not performed again until the next video/audio segment is detected. After either step 628 or 630, the Capture logic loops back to step 606.

If in step 608, however, the transition indication is not a first transition indication, the Capture logic proceeds to step 632. In step 632, the Capture logic tests to determine whether the transition indication is second transition indication. If so, the Capture logic advances to step 634. In step 634, the CAPTURE logic tests the capture flag to determine whether it is set thereby indicating that a search parameters match has occurred in the current television segment. If the capture flag is set, then the CAPTURE logic advances to step 636 where it tests to determine whether an email flag has been set in the search parameters and scheduling information. If the email flag has been set, the CAPTURE logic proceeds to step 638 where it generates an email message to specified recipients with information indicating that a capture has occurred for the specified search parameters. The email message can include information such as a time, date, length of capture segment, channel(s), the snap-shot image, and a link to the captured video file for immediate viewing. In step 640, the CAPTURE logic completes the capture management database by determining the time, date, and length of the capture video segment. If in step 634, the capture flag is not set, the CAPTURE logic proceeds to step 642 where the current video/audio segment being stored to the hard-disk storage device is terminated and erased along with the database entry relating to that video/audio segment. If in step 632, however, a second transition indication is not detected, the Capture logic advances to step 616 where it continues to monitor the closed caption data stream for the user search parameters.

After either step 640 or 642, the CAPTURE logic advances to step 644 were it determines whether all of the search parameters and scheduling information has been satisfied. For example, if the search parameters and scheduling information indicate that another search is to be presently performed, the CAPTURE logic loops back to step 606. If, however, the search parameters and scheduling information do not indicate that another search is to be presently performed, the CAPTURE logic ends.

The operation of the CAPTURE logic will now be presently describe with reference to the search parameters and scheduling information shown in FIG. 8 and the capture management database of FIG. 9. Referring now to FIG. 8, the search parameters and scheduling information indicate that a search on the date of Dec. 20, 1999, on channel 10 between the hours of 8:00 A.M. and 5:00 P.M. for a television segment that includes the following closed caption text: IBM and (market or computer). Furthermore, the scheduling information indicates that a SCHEDULER program is to be programmed with the described search parameters. On the appropriate date and start time, the SCHEDULER program will initiate the COG logic. The COG logic will program the television card with channel 10 and the CAPTURE logic will execute. The CAPTURE logic will create a capture management database 900 entry (e.g., 1) and will commence monitoring of the closed caption data stream for a transition indication. Upon the detection of a transition indication, the CAPTURE logic commences the creation of a video/audio file and enters the file name (i.e., 121031AE.MPG) into the capture management database 900. Additionally, the first sentence following the transition indication is recorded in the capture management database (i.e., IBM releases new computer.) The first sentence is used for identifying the nature and substance of the captured television segment. Approximately eight seconds after the transition indication, the CAPTURE logic creates a snap-shot image of the television segment (i.e., capture management database entry 121031AE.JPG) and stores the image to the hard-disk storage device. The snap-shot image is also used for identifying the nature and substance of the captured television segment. The CAPTURE logic monitors the closed caption data stream for a search parameters "IBM and (market or computer)." If the closed caption data stream includes the words "IBM" and "market" or "IBM" and "computer," the CAPTURE logic will set a capture flag (i.e., Capture=1). Upon the occurrence of another transition indication, the CAPTURE logic tests the capture flag. If the capture flag is set, the email flag is tested. If the email flag is set, an email message is generated to one or more recipients and the capture management database entries of Time (i.e., 9:15 A.M.), Date (i.e., Dec. 30, 1999), and Length (i.e., 0.2) are determined and entered. In this manner, the CAPTURE logic creates and completes the capture management database 900.

Figure 7:
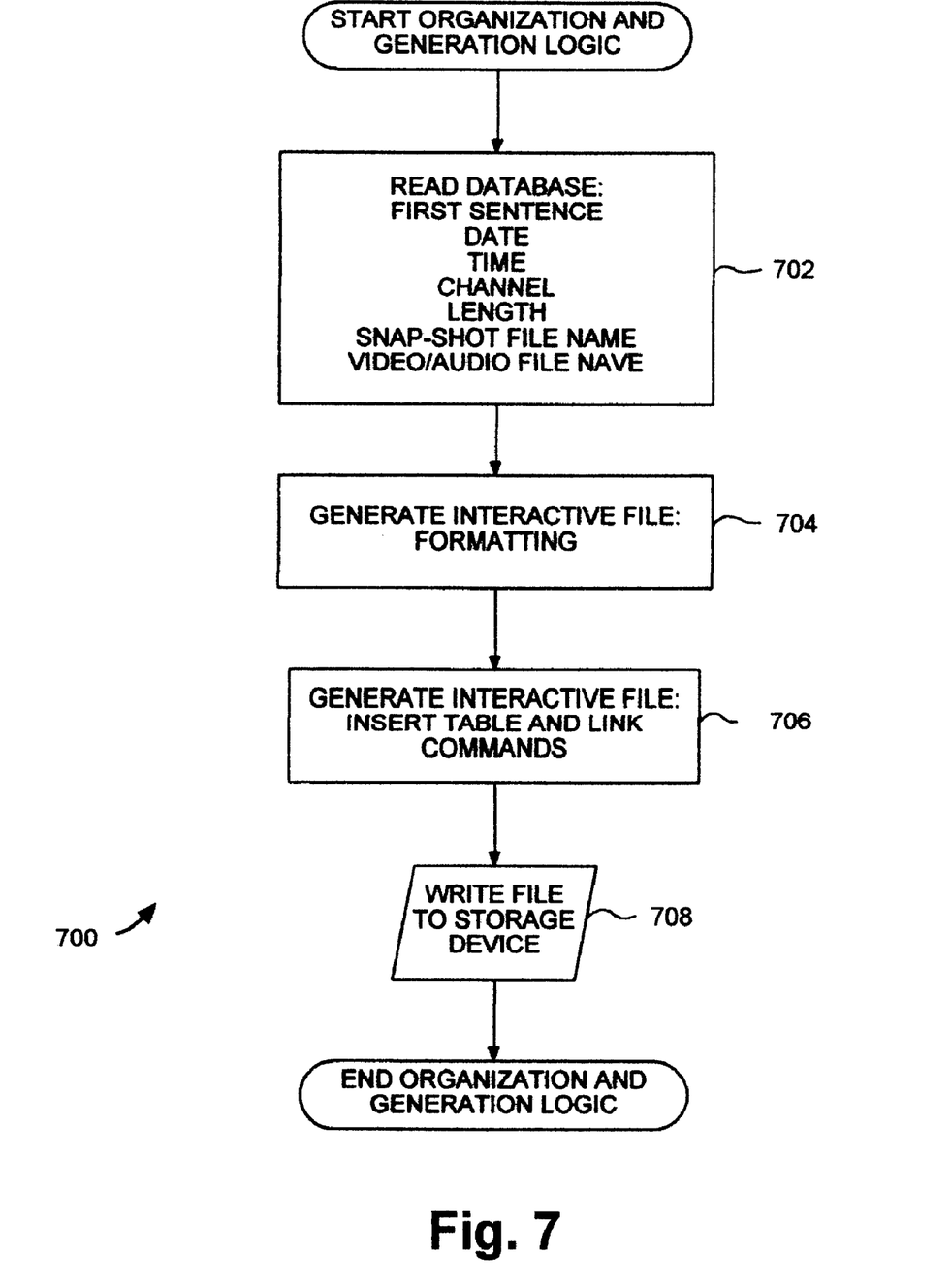
FIG. 7 is a flowchart illustrating the Organization and Generation logic (hereinafter OG logic) of the present invention.

Referring now to FIG. 7, the ORGANIZATION and GENERATION logic 700 (hereinafter OG logic) of the present invention is shown. The OG logic begins in step 702 where the capture management database 900 is read. After step 702, the OG logic advances to steps 704 and 706 where an interactive file is generated. The interactive file is preferably a HyperText Markup Language (HTML) file. Step 704 inserts proper body formatting commands for generating the interactive file and step 706 inserts table and link commands to the interactive file so that the information stored in the capture management database can be properly displayed and linked. HTML programming is well-known and therefore will not be discussed further. Once the interactive file is created, it is stored to the hard-disk storage device in step 708. After step 708, the OG logic ends.

Figure 10:
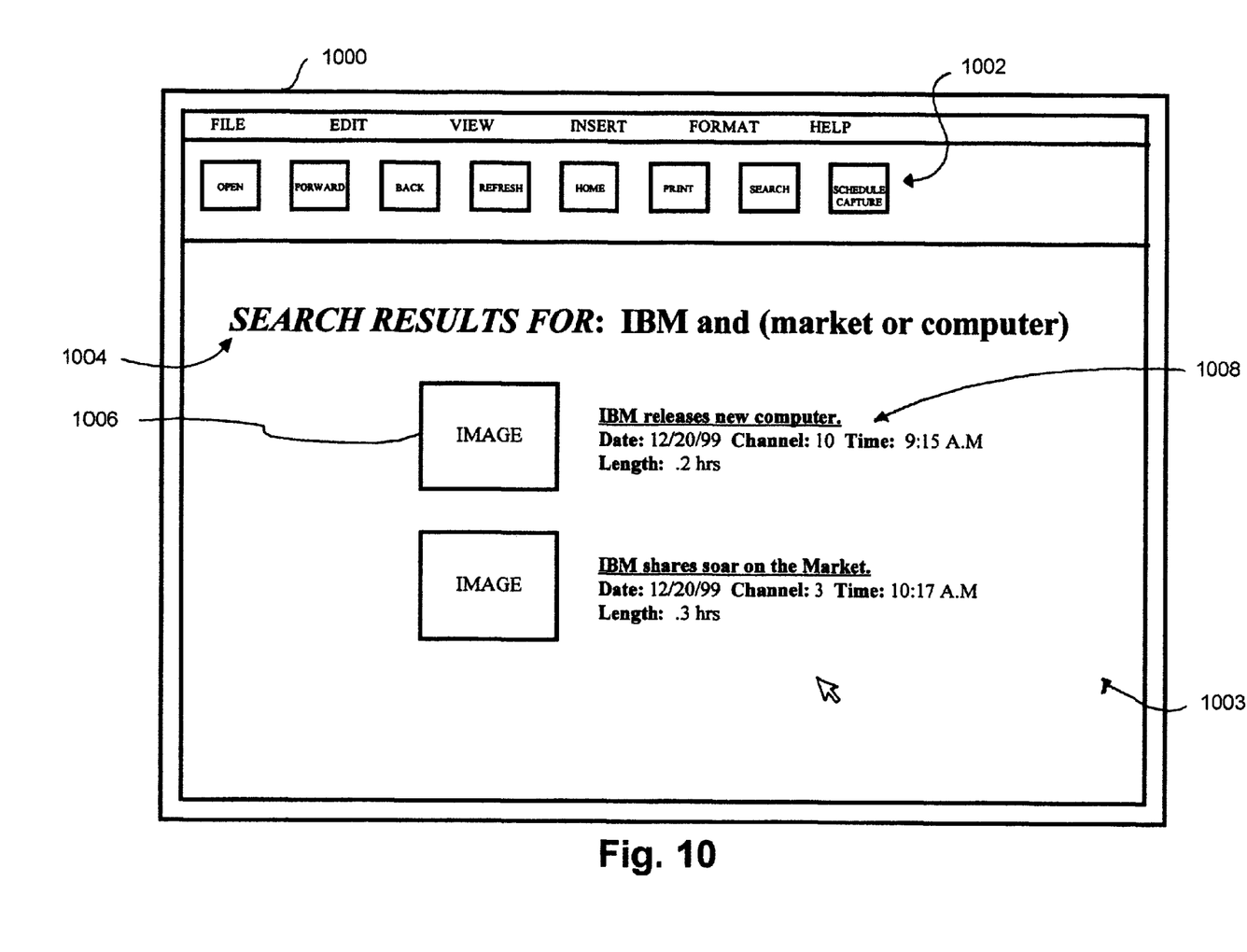
FIG. 10 is an illustration of an interactive results file of the present invention executing on a browser-type program for viewing, navigating and displaying capture results.

Illustrated in FIG. 10 is a display 1000 of a browser program executing the interactive file generated by the OG logic. The browser program includes a row of navigation buttons indicated at 1002 and an interactive display area indicated at 1003. The interactive file generated by the OG logic displays a "SEARCH RESULTS FOR:" title with the search parameters search equation and displays the captured television segment information at 1006 and 1008. The previously stored snap-shot image of the captured television segment is displayed at 1006 and the time, date, channel, length, and first sentence information 1008 is displayed in close proximity to the snap-shot image. The first sentence (i.e., IBM releases new computer) is preferably linked to the captured video/audio file so that when a user selects, e.g., single-clicks a pointer device on the first sentence, a display showing the captured television segment is executed. Alternatively, the snap-shot image may be linked to the captured television segment. In this manner, a user may view, navigate, and watch captured television segments which satisfied the user's search parameters and scheduling information.

While the present invention has been illustrated by the description of embodiments thereof, and while the embodiments have been described in considerable detail, it is not the intention of application to restrict or in any way limit the scope of the appended claims to such detail. Additional advantages and modifications will readily appear to those skilled in the art. For example, languages other than HTML may be used (i.e., Java, C++, etc.) to generate the interactive file, email recipients may receive snap-shot images in addition to other capture management database linked information, and/or the computer system may include a built in television tuner and closed caption decoder. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A method for capturing, organizing, and presenting information generated from a television program comprising the steps of:
    (a) providing a multimedia computer system;
    (b) inputting a broadcast television signal into the multimedia computer system;
    (c) generating closed caption data from the broadcast television signal;
    (d) storing digital video generated from the broadcast television signal;
    (d) monitoring the closed caption data for a specified condition;
    (e) generating a snap-shot image of the digital video;
    (f) storing a portion of the closed caption data;
    (g) monitoring the closed caption data for transition indications;
    (h) generating an interactive list comprising the snap-shot image and the stored closed caption text; and
    (i) generating a file comprising the interactive list.

2. The method of claim 1 further comprising the step of generating an email message.

3. The method of claim 1 further comprising the step of linking the stored closed caption text to the stored digital video.

4. The method of claim 1 further comprising the step of displaying the interactive list on a display device.

5. The method of claim 4 further comprising the step of playing the digital video responsive to a selection of the displayed closed caption text in the displayed interactive list.

6. A multimedia computer system for capturing, organizing, and presenting information derived from a television signal comprising:
    (a) CPU;
    (b) a storage device for storing digital data;
    (c) a display device for displaying multimedia information;
    (d) a video tuner for receiving one or more television signals and for generating digital video and audio and closed caption data;

(e) logic for capturing, organizing, and generating information from a television signal comprising:
   (1) logic for storing the digital video and audio to the storage device;
   (2) logic for monitoring the closed caption data for a transition indication;
   (3) logic for storing the closed caption data corresponding to a portion of the closed caption data occurring after the transition indication;
   (4) logic for determining whether the closed caption data includes a specified condition;
   (5) logic for generating an interactive list comprising the portion of the closed caption data wherein the portion of the closed caption data is linked to the digital video and audio data; and
   (6) logic for playing the digital video and audio responsive to the selection of a linked portion of closed caption data.

7. The multimedia computer system of claim 6 wherein the logic for capturing, organizing, and generating information from a television signal further comprises logic for generating a snap-shot image of the digital video at a predetermined time period following an occurrence of a transition indication.

8. The multimedia computer system of claim 7 wherein the logic for capturing, organizing, and generating information from a television signal further includes logic for associating the digital video and audio, the portion of the closed caption data, and the snap-shot in the interactive list.

9. The multimedia computer system of claim 6 wherein the logic for capturing, organizing, and generating information from a television signal further comprises logic for generating one or more email messages upon the determination that the closed caption data includes a specified condition.

10. The multimedia computer system of claim 6 wherein the specified condition comprises the occurrence of at least one key word.

11. The multimedia computer system of claim 6 wherein the interactive list comprises a HTML program.

12. The multimedia commuter system of claim 6 wherein the portion of closed caption data comprises the first sentence occurring after a transition indication.

13. A method for capturing, organizing, and presenting information generated from a television program comprising the steps of:
   (a) providing a multimedia computer system;
   (b) inputting a broadcast television signal into the multimedia computer system;
   (c) generating digital video and closed caption data from the broadcast television signal;
   (d) monitoring the closed caption data for transition indications;
   (e) after the occurrence of a transition indication, storing the digital video to a storage device;
   (f) after the occurrence of a transition indication, storing all closed caption data between the transition indication and a predetermined ending condition represented by a period character symbol;
   (g) after a predetermined time period following the occurrence of a transition indication, generating a snapshot image of the video; and
   (h) after the occurrence of a transition indication, monitoring the closed caption data for a specified condition.

14. The method of claim 13 further comprising the step of associating the stored digital video, the snap-shot image of the video, and the stored closed caption data with each other.

15. A method for capturing, organizing, and presenting information generated from a television program comprising the steps of:
   (a) providing a multimedia computer system;
   (b) inputting a broadcast television signal into the multimedia computer system;
   (c) generating digital video and closed caption data from the broadcast television signal;
   (d) monitoring the closed caption data for transition indications;
   (e) after the occurrence of a transition indication, storing the digital video to a storage device;
   (f) after the occurrence of a transition indication, storing the closed caption data comprising a portion of text;
   (g) after a predetermined time period following the occurrence of a transition indication, generating a snapshot image of the video;
   (h) after the occurrence of a transition indication, monitoring the closed caption data for a specified condition;
   (i) generating an interactive list comprising the snap-shot image and the stored closed caption text; and
   (j) generating a file comprising the interactive list.

16. The method of claim 15 further comprising the step of executing the file to display the interactive list on a display device.

* * * * *